Feb. 18, 1969     L. GREINER     3,427,803
OXIDIZER TO FUEL RATIO CONTROL RESPONSIVE TO
CONDENSUCTOR PRESSURE
Filed Sept. 1, 1967

LEONARD GREINER
INVENTOR.

BY *[signature]*
ATTORNEY

United States Patent Office 3,427,803
Patented Feb. 18, 1969

3,427,803
OXIDIZER TO FUEL RATIO CONTROL RESPONSIVE TO CONDENSUCTOR PRESSURE
Leonard Greiner, Palo Alto, Calif., assignor to United Aircraft Corporation, East Hartford, Conn., a corporation of Delaware
Filed Sept. 1, 1967, Ser. No. 665,046
U.S. Cl. 60—39.03                                7 Claims
Int. Cl. F02c 9/14, 3/20

ABSTRACT OF THE DISCLOSURE

Means for maintaining stoichiometric oxidizer to fuel ratio in an underwater power plant employing a condensuctor. Such means adjust the flow of at least one of the propellant components in response to changes in back pressure sensed by the prime mover.

Background of the invention

Underwater power plants employing a condensuctor are known to the art for such applications as torpedo propulsion, deep submergence vehicle propulsion, swimmer propulsion, and operation of underwater equipment. When operating at substantial depths, the ambient pressure of the sea water, if sensed by the prime mover, will reduce the efficiency of the prime mover. A condensuctor is a device which mixes the exhaust from the prime mover with ambient sea water to reduce the back pressure sensed by the prime mover. Condensuctors, such as are described in Astronautics and Aeronautics, March 1965, p. 53 and 54, permit the prime mover to sense a pressure approaching that of the vapor pressure of water at the temperature in the condensuctor rather than the ambient pressure and permits greater efficiency to be obtained at substantial depth.

In order for a condensuctor to function properly, the gaseous components of the exhaust must be substantially free of noncondensable gases which in turn requires maintenance of stoichiometric oxidizer to fuel ratio (O/F). As used herein, a condensable gas is a gas which condenses to nongaseous products on cooling with water and the exhaust is considered substantially free of noncondensible gas if it contains less than 1% by volume of noncondensable gases. If the power plant is driven by a monopropellant gas generator, no particular problem exists with respect to maintenance of proper O/F since the proper ratio of materials occurs in the propellant itself. However, in propellant systems employing at least one fluid component which flows to the combustion chamber, such as fluid bipropellant or hybrid propellant systems, variations in flow of the components or changes in geometry of the solid component of a hybrid system can cause undesirable deviations from stoichiometric O/F. Accordingly, it is an object of this to provide a system for maintaining optimum O/F in an underwater power plant employing a condensuctor. It is another object of this invention to provide a system which controls the flow of one propellant to the combustion chamber of an underwater power plant in response to deviations in condensuctor pressure.

Figure 1:
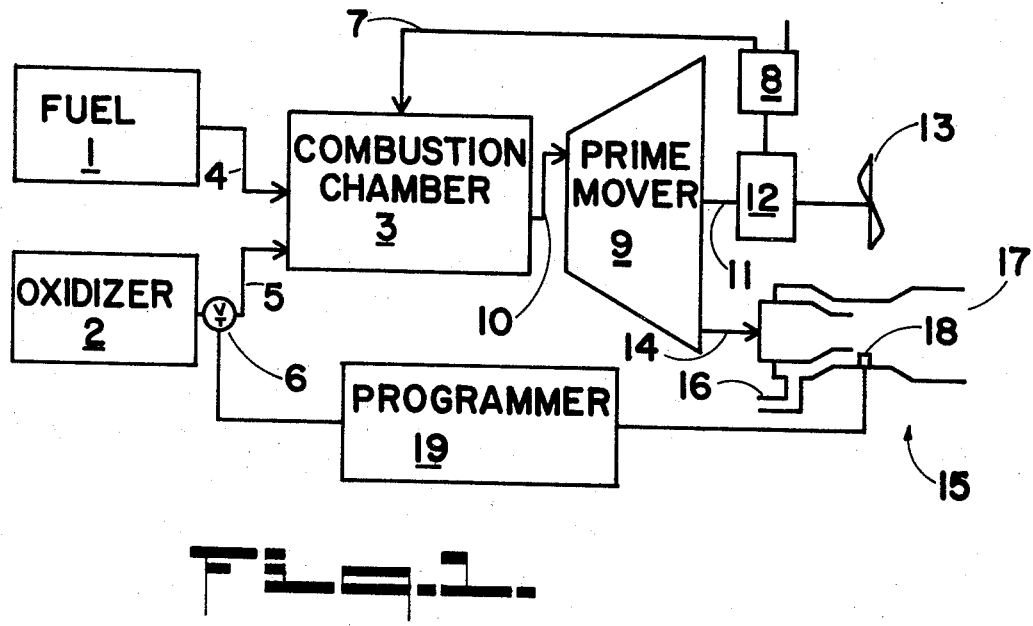
Figure 2:
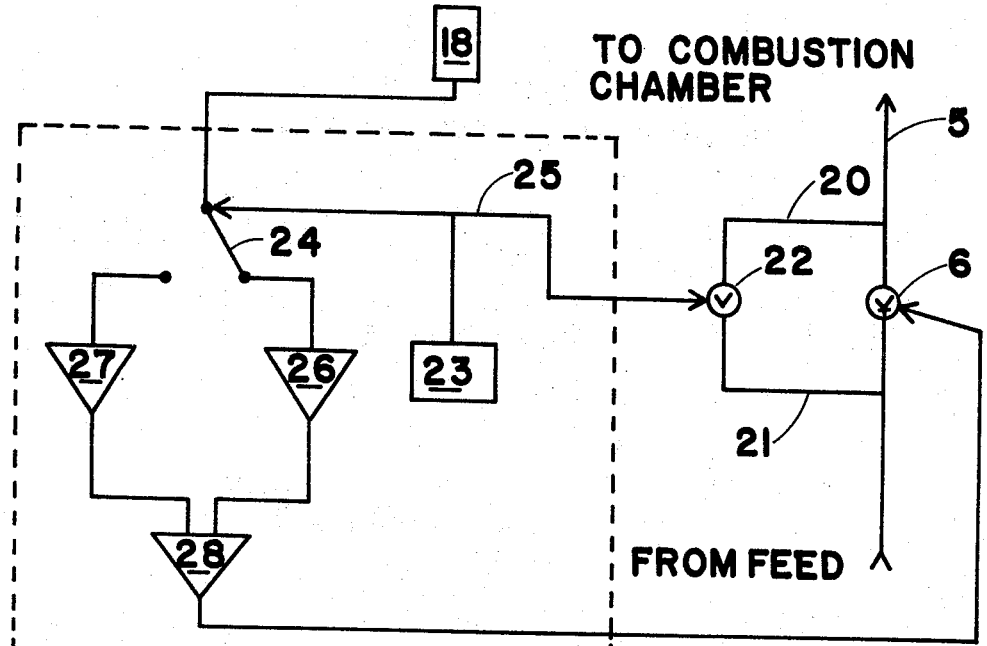

These and other objects of his invention will be readily apparent from the following description with reference to the accompanying drawings wherein:

FIGURE 1 is a schematic representation of an underwater power plant, and
FIGURE 2 is a circuit diagram of an embodiment of control circuitry usable in this invention.

Many propellant systems are known to the art to be capable of producing condensable exhaust gas and the specific propellants employed form no part of this invention. For simplicity, a fluid bipropellant system will be described in FIGURE 1, it being understood that if a hybrid system is employed according to this invention, one of the sources of propellant will be eliminated and the solid component included within the combustion chamber.

Referring now to FIGURE 1, an underwater propulsion system comprises a pressurized source of fuel 1 and oxidizer 2, for example, hydrogen and oxygen. A combustion chamber 3 is in communication with sources 1 and 2 by lines 4 and 5. Remote actuated valve 6 regulates the flow rate of oxidizer in line 5. Water is introduced into chamber 3 from line 7 by pump 8 from the ambient water. The water cools chamber 3 and produces a working fluid of steam at reasonable temperatures and pressures which is directed to prime mover 9 by line 10. Drive shaft 11 supplies torque to gear box 12 which drives pump 8 and propeller 13. The working fluid is directed from prime mover 9 by line 14 to condensuctor 15 wherein it is mixed with ambient sea water from inlet 16 and exhausted to the environment through outlet 17. A pressure transducer 18 measures the back pressure sensed by the prime mover. Transducer 18 is preferably located at the point of lowest pressure within condensuctor 15 but may be located at points intermediate of the prime mover and the point of lowest pressure. Transducer 18 sends a signal to programmer 10 which actuates valve 6 as will be explained below.

When the system is operating at stoichiometric O/F, the gaseous exhaust products entering condensuctor 15 will consist entirely of the condensable gas, steam; and the pressure sensed by transducer 18 will be the vapor pressure of water at the temperature within the condensuctor. If the O/F becomes either fuel rich or oxidizer rich, the transducer will sense a higher pressure due to the presence of the noncondensable gases, hydrogen or oxygen, respectively. In response to the signal indicating higher pressure, the programmer changes the setting of valve 6 to bring the O/F back to stoichiometric. The programmer 19 must be capable of determining whether the pressure rise is due to fuel rich or oxidizer rich conditions since both conditions will produce the pressure increase. One method for accomplishing this function is for programmer 19 to change the setting of valve incrementally and compare the new pressure with that previously sensed. If the new pressure is higher than the preceding pressure, this indicates that the setting of valve 6 is being changed in the wrong direction. Programmer 6 will then reverse the change of setting of valve 6 until optimum pressure is obtained.

Another approach is illustrated in FIGURE 2. In this embodiment, valve 6 control the flow rate in line 5 to the combustion chamber as in FIGURE 1. In addition to valve 6, bypass lines 20 and 21 are provided and fitted with valve 22. Programmer 19 comprises a switch drive unit 23 which opens and closes valve 22 and simultaneously actuates switch 24 through linkage 25. Thus, when valve 22 is opened, the signal from transducer 18 is sent to amplifier 26 and when valve 22 is closed, the signal is sent to amplifier 27. The outputs from amplifiers 26 and 27 are sent to sense amplifier 28 which detects a difference in the value of the signals from amplifiers 26 and 27 and adjusts valve 6 in the proper direction to maintain the signals from amplifiers 26 and 27 at equal intensities.

In the system of FIGURE 2, valve 6 is initially set to supply the oxidizer at a flow rate slightly less than required to be at stoichiometric O/F and valve 22 is designed to supply, when open, sufficient oxidizer to bring the O/F to slightly oxidizer rich conditions as set forth in the following relationships wherein V is the oxidizer flow rate at stoichiometric O/F, $V_0$ is the flow rate through valve 6, $V_1$ is the flow rate through valve 22 and $\Delta V$ is the difference between actual flow rate and stoichiometric flow rate.

(1) Valve 22 opened  $V_0+V_1=V+\Delta V$
(2) Valve 22 closed  $V_0=V-\Delta V$
(3) ∴  $V_1=2\Delta V$ Under these conditions, the pressure sensed by transducer 18 will be slightly higher than at stoichiometric O/F but this $\Delta p$ will be the same regardless of whether valve 22 is opened or closed. Sense amplifier 28 will detect no difference in signal strength from amplifier 26 and 27 and no change will be made in the setting of valve 6. If the signal from amplifier 26 is greater than from amplifier 27, this is indication of an oxidizer rich condition and sense amplifier 28 will generate a signal which adjusts valve 6 in the closed direction. Conversely, if the signal from amplifier 27 is greater than from amplifier 26, this is indicative of a fuel rich condition, and sense amplifier 28 will generate a signal which adjusts valve 6 in the open direction.

In the above system, the frequency of the switching pulses will be selected in accordance with the dwell time of the fluid between valve 22 and transducer 18 so that the signal sensed by transducer 18 will be representative of the condition produced by valve 22.

While this invention has been described with respect to specific embodiments therefore it should not be construed as limited thereto. Various modifications can be made without departing from the scope of this invention which is limited only by the following claims wherein:

I claim:
1. A method for generating power underwater which comprises
  (a) generating a condensable working fluid by chemical reaction of at least two reactants at least one of which is a fluid, said reactants producing condensable reaction products when reacted in a predetermined ratio,
  (b) passing said working fluid through a prime mover,
  (c) exhausting said working fluid to the underwater surroundings through a condensuctor,
  (d) generating a signal representative of back pressure sensed by the prime mover, and
  (e) regulating the flow rate of said fluid reactant to produce condensable exhaust products in response to the signal representative of back pressure.

2. The method of claim 1 wherein said signal representative of back pressure is generated in the condensuctor.

3. In a method for generating power underwater wherein an exothermic reaction is conducted between a fluid reactant and at least one other reactant to produce reaction products containing condensable gases; a working fluid is generated at least a portion of which comprises said reaction products; said working fluid is passed through a prime mover and said working fluid is exhausted through a condensuctor, the improvement whereby the gaseous components of said working fluid are maintained substantially condensable which comprises generating a signal representative of back pressure sensed by said prime mover and regulating the flow rate of said fluid reactant in response to said signal.

4. The method of claim 3 wherein said signal is generated in said condensuctor.

5. An underwater power plant comprising
  (a) source of a fluid reactant;
  (b) reaction means for reacting said fluid reactant exothermically with at least one other reactant capable of producing reaction products the gaseous components of which are condensable gases;
  (c) flow control means for varying the flow rate of said fluid reactant to said reaction means;
  (d) a prime mover;
  (e) means for directing said reaction products to said prime mover;
  (f) a condensuctor in fluid communicating relationship with said prime mover;
  (g) signal generating means for generating a signal representative of prime mover back pressure; and
  (h) means for adjusting said flow control means in response to signals generated by said signal generating means whereby the gaseous reaction products are maintained substantially free of noncondensable gases.

6. The power plant of claim 5 wherein said signal generating means are located within said condensuctor.

7. The power plant of claim 6 wherein said reaction means comprises a combustion chamber containing a reactant in solid form.

References Cited
UNITED STATES PATENTS

| | | | |
|---|---|---|---|
| 3,134,228 | 5/1964 | Wolansky | 60—39.46 |
| 3,229,462 | 1/1966 | Fatica | 60—39.46 |
| 3,328,957 | 7/1967 | Rose | 60—39.46 |

CARLTON R. CROYLE, *Primary Examiner.*

DOUGLAS HART, *Assistant Examiner.*

U.S. Cl. X.R.
60—39.29, 39.46